Patented Aug. 31, 1926.

1,598,334

UNITED STATES PATENT OFFICE.

HARPER F. ZOLLER, OF DETROIT, MICHIGAN.

PROCESS OF MAKING EDIBLE ALKALI CASEINATE.

No Drawing.     Application filed May 8, 1922. Serial No. 559,462.

This invention relates to an improved alkali caseinate, especially suitable for food purposes, and to the method of making said caseinate.

The general object of said invention is the production at moderate cost of a casein food product that is highly nutritive, easily digested, non-toxic, and capable of being kept for long periods without spoiling or deteriorating.

Other objects more or less incidental or ancillary to the foregoing, as well as the manner of attaining the various objects will appear in the following detailed description of the new product and process of making it.

In carrying out my process I make use of either fresh curd casein made from fresh skimmed milk by the so-called grain curd process or of specially prepared hydrochloric acid casein in dry form. I will first describe the procedure using the fresh curd casein and then will indicate the modification of the treatment necessary when the dry casein is used.

Taking a suitable quantity of fresh skimmed milk in a suitable wooden tank or enamel lined container, the casein is precipitated by the aforesaid "grain curd" process according to which the skimmed milk (if Pasteurized) is heated to 93° F.–95° F., and to it hydrochloric acid (1 to 8) is added in spray form with some agitation until the milk "breaks" into a soft curd. More acid is then added slowly with sufficient stirring to form a pea-sized curd at the first appearance of pronounced red with the indicator methyl red, this being at about 4.2 p. H. in the presence of whey.

The casein having been thus precipitated in curd form, the whey is now drawn off from the settled curd, except for a small amount, preferably about one-twentieth of the entire volume of whey, which is left on the casein curd to act as a buffer against the strong alkali solution which is later added. It is undesirable to leave much of the whey in case the skimmed milk is very sour in the beginning since an excess of the whey is likely to result in an off-flavor which remains in the finished caseinate. As a substitute for all or a part of the whey, a solution of neutral alkali citrate or phosphate may be added to the curd. I prefer however in using moist curd to use the whey alone as buffer. The presence of some whey, or potash salts, renders the solubilizing action of the alkali more rapid.

To the moist casein, obtained as above described, is now added warm water in a quantity sufficient to render the final solution of a consistency suitable for powdering by the spraying method. In the case of sodium alkali caseinate, a solution of 20% to 30% caseinate is suitable.

For alkali I prefer to use sodium hydroxide either in the form of soda ash or sodium hydroxide sticks or lumps. The sodium hydroxide is dissolved in water to form a 5% solution and this solution is added a little at a time to the moist curd suspended in the water with rapid, vigorous stirring. As the alkali is slowly and gradually added, frequent tests are made to avoid the addition of alkali in excess of that required to dissolve the casein. These tests are made with brom cresol purple and phenol red, using .05% water solutions of these indicators. The proper amount of alkali has been added when all the casein particles appear to be in solution and a drop of the solution on a white background shows bluish purple with brom cresol purple and shows yellow-orange with phenol red.

The alkali caseinate solution meeting the test last mentioned has a hydrogen-ion concentration ranging between 6.2 p. H. and 6.8 p. H., or, in other words, is in the zone of reaction of normal fresh milk and its concentrates. This method of controlling the production of alkali caseinate I call the lacto-hydric caseinate process.

The caseinate solution in the final solubilizing stage may be heated with either live steam or by jacketed steam, to a temperature as high as the boiling point, if necessary. After the alkali has once soaked into the centers of the curd grains, heat facilitates the dissolving of the curd. However, care should be taken that the suspension of curd in the water is not hot when the alkali is first added.

When the casein is completely in solution and the concentration of the caseinate is at about 20%–30% total solids, the solution is ready for Pasteurization. This is effected by heating the solution to about 150° F. for thirty minutes or longer in any modern Pasteurizing apparatus. This solution, now free from lumps, is of an opal to a milky shade, free from odor of over neutralization, and tastes much like a solution of good gelatin.

If the caseinate is to be dried, the solution, after Pasteurization, can be conducted directly, either with or without addition of sugar, to the spray powder box, vacuum drum drier, or any other suitable form of milk drying apparatus. If the caseinate solution is to be preserved for a short time only this can be done by adding a suitable amount of sugar, after Pasteurization, at a concentration such as is customarily used in making sweetened condensed milk.

If suitable dried casein is available, instead of starting the process with the preparation of the moist curd, as above described, I proceed as follows. The dry casein which should be carefully prepared from fresh skimmed milk by precipitation with hydrochloric acid, is finely ground and suspended in water to which is added about 1% to 2% of neutral alkali citrate or phosphate, the amount of water taken being such as to secure a final caseinate solution with about 20%–30% total solids. This liquid suspension of the casein, while being vigorously stirred or agitated, has slowly added to it the 5% alkali solution previously described. As the alkali is gradually added, frequent tests are made with the brom cresol purple and phenol red to insure that an excess of the alkali shall not be added. As in the first procedure above described, the proper amount of alkali has been added when all of the casein particles appear to be in solution and a drop of the solution on a white background shows bluish purple with the brom cresol purple and shows yellow-orange with phenol red. The casein solution now has a hydrogen-ion concentration between 6.2 p. H. and 6.8 p. H., corresponding to the zone of reaction of ordinary fresh milk and its concentrates. With the casein thoroughly solubilized at its final reaction and the concentration of the solution at about 30% total solids, the solution is ready for Pasteurization and drying or preserving as in the former procedure.

It will be seen that in the use of the dry casein the only essential difference in the procedure, as compared with the use of the moist curd, is the use of the alkali citrate or phosphate as a buffer in lieu of whey or a mixture of whey and citrate or phosphate. In so far as the operativeness of the process is concerned the buffering solution may consist of whey or alkali citrate or alkali phosphate or a mixture of any two or more of them. In the case of the first described procedure it will be understood that it is convenient to make use of the whey.

My improved sodium caseinate prepared by the above described process in dry powdered form is white or faint gray in color. Its water solution is iso-hydric with that of milk or its concentrates, and it is entirely free from toxic substances. Finally, when dried in powdered form either with or without the addition of sugar, it will keep for an indefinite period under sanitary conditions.

As the alkali caseinates made according to my lacto-hydric process have their reaction in solution at the same zone of hydrogen-ion concentration as fresh cow's milk, their nutritive character is of the same order of physiological value as that of fresh milk.

The lacto-hydric method of adding the alkali to the buffered suspension of casein or casein curd prevents alkali cleavage of the loosely bound sulphur, phosphorous and nitrogen from the casein molecule, or in other words, prevents what is commonly known as alkali hydrolysis. Where such alkali hydrolysis occurs toxic products are usually produced and the resulting product is not suitable for use as a food.

Furthermore the product prepared by my improved process has very remarkable keeping qualities. Not only will the product keep indefinitely, as above stated but in water solution it will keep without the addition of preservatives much longer than caseinates prepared by any other method known to me.

I believe that the distinctive properties characteristic of my improved product are due essentially to the use of acid-precipitated casein and to the definite control of the solubilizing agent in the presence of a buffer solution of the character set forth.

While I have described above the preferred procedure in carrying out my process it is to be understood that there can be variation in different respects without departing from the invention as defined in the appended claims.

What I claim is:

1. The process of producing alkali caseinates which comprises preparing a liquid suspension of acid-precipitated casein and, in the presence of a buffering solution adapted to prevent decomposition of the casein by strong alkali, gradually adding thereto alkali solution until the casein is dissolved without material excess of alkali.

2. The process of producing alkali caseinates which comprises preparing a liquid suspension of acid-precipitated casein and, in the presence of a weak solution of alkali phosphate, gradually adding alkali solution to the stirred liquid until the casein is dissolved without material excess of alkali.

3. The process of producing alkali caseinates which comprises preparing a liquid suspension of acid-precipitated casein and, in the presence of a buffering solution adapted to prevent decomposition of the casein by strong alkali, gradually adding thereto solution of sodium hydroxide until the casein is dissolved without material excess of alkali.

4. The process of producing alkali caseinates which comprises preparing a liquid suspension of acid-precipitated casein and, in the presence of a buffering solution adapted to prevent decomposition of the casein, gradually adding alkali solution to the stirred liquid until the casein is dissolved and the solution has a hydrogen-ion concentration between 6.2 p. H. and 6.8 p. H.

In testimony whereof, I hereunto affix my signature.

HARPER F. ZOLLER.